United States Patent [19]
Arendt et al.

[11] 4,216,278
[45] Aug. 5, 1980

[54] PROCESS OF MAKING ELECTROLYTE STRUCTURE FOR MOLTEN CARBONATE FUEL CELLS

[75] Inventors: Ronald H. Arendt; Matthew J. Curran, both of Schenectady, N.Y.

[73] Assignee: General Electric Company, Schenectady, N.Y.

[21] Appl. No.: 14,230

[22] Filed: Feb. 23, 1979

[51] Int. Cl.$^2$ ............................................. H01M 8/14
[52] U.S. Cl. ....................................... 429/188; 429/46
[58] Field of Search ...................... 429/46, 26, 41, 12, 429/112, 188

[56] References Cited
U.S. PATENT DOCUMENTS

| | | | |
|---|---|---|---|
| 2,276,188 | 3/1942 | Greger | 429/26 |
| 3,251,718 | 5/1966 | Hilton | 429/41 |
| 3,432,363 | 3/1969 | Gillis | 429/12 |
| 4,079,171 | 3/1978 | Marianowski et al. | 429/46 |

Primary Examiner—Donald L. Walton
Attorney, Agent, or Firm—Jane M. Binkowski; James C. Davis, Jr.; Leo I. MaLossi

[57] ABSTRACT

An electrolyte structure is produced by forming matrix material powder into a blank at room temperature and impregnating the resulting matrix blank with molten electrolyte.

10 Claims, No Drawings

PROCESS OF MAKING ELECTROLYTE STRUCTURE FOR MOLTEN CARBONATE FUEL CELLS

The Government of the United States of America has rights in this invention pursuant to Department of Energy Contract No. DE-AC03-77ET11319.

The present invention relates to the fabrication of an electrolyte structure for molten carbonate fuel cells.

Generally, molten carbonate fuel cells are comprised of a cathode, an anode, and an electrolyte structure disposed between the cathode and anode. The electrolyte structure is composed of carbonate electrolyte and a supporting matrix. Under fuel cell operating conditions, at temperatures usually in the range of about 500° C. to 700° C., the supporting matrix acts to retain, via capillary action, the electrically active molten carbonate between the cell electrodes, thereby alleviating the need to physically anchor the electrodes as rigidly as would be required with a pure liquid electrolyte system.

It is anticipated that $\sim$38,000 ft.$^2$ of electrolyte structure are required for each contemplated 4.8 Mw module. Current electrolyte structure preparation requires hot pressing a mixture of $LiAlO_2$ support and $Li_2CO_3$-$K_2CO_3$ electrolyte at $\sim$490° C. for several hours at $\sim$5000 psi. Those familiar with this fabrication technique will recognize the long process times and high capital/labor investments associated with this process as it now exists. In contrast, the present method of fabricating electrolyte structure for molten carbonate fuel cells is far more applicable to mass production requirements. It requires less time and labor and is relatively continuous in nature.

The present invention is predicated on the existence of the support material, for example $LiAlO_2$, as a phase-pure or single compound, electrolyte-free powder ranging in size up to about 1 micron. By phase-pure or single compound powder it is meant herein phase-pure or single compound according to X-ray Diffraction Analysis.

Briefly stated, the present invention comprises providing supporting matrix powder ranging up to about 1 micron in size, forming the powder into a matrix blank having a pore volume ranging from about 50% by volume to about 70% by volume of the blank, and infiltrating molten carbonate electrolyte throughout the matrix blank.

The present supporting matrix material powder ranges in size up to about 1 micron. The particular size or size distribution used depends largely on the particular pore volume desired in the matrix blank. The matrix material powder should be chemically inert under fuel cell operating conditions. Specifically, it should be at least substantially chemically inert toward the electrolyte, electrode materials, and reactant and product gases. Preferably, this material is inherently chemically stable, i.e., a single, well-defined chemical compound rather than a mixture of compounds which could undergo reaction under service conditions. Single compound $LiAlO_2$ is a particularly preferred support material in the present invention, and it is preferably produced by the process disclosed in co-pending application Ser. No. 8,734 entitled "MOLTEN SALT SYNTHESIS OF LITHIUM META-ALUMINATE POWDER" filed on or about Jan. 31, 1979 in the names of Ronald Henry Arendt and Matthew John Curran, and incorporated herein by reference. This co-pending application discloses a particulate mixture of an alkali chloride solvent salt selected from the group consisting of lithium chloride, potassium chloride, sodium chloride and mixtures thereof, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma-alumina and mixtures thereof, is heated to melt the chloride salt solvent in which the lithium and aluminum salt reactants dissolve and react precipitating lithium meta-aluminate which is then recovered as a single compound material ranging in size up to about 1 micron.

The matrix material powder is formed into a matrix blank using conventional ceramic processing techniques at room temperature. For example, the powder can be extruded, injection molded, die-pressed, isostatically pressed, tape cast or slip cast. Any lubricants, binders or similar materials used in forming the matrix blank should have no significant deteriorating effect on it. Also, such materials are preferably of the type which evaporate on heating at relatively low temperatures, preferably below 200° C., leaving no significant residue.

The matrix blank should have a pore volume ranging from about 50% by volume to about 70% by volume of the blank. The pores in the matrix blank are interconnecting and distributed at least substantially uniformly throughout the blank. The pore volume is comprised of capillary-sized interstices between compacted particles, and for best results, the pores are submicron in size. A pore volume of $\sim$50% of the total blank volume, corresponds to an electrolyte loading of $\sim$45 wt% of the weight of the final electrolyte structure.

If desired, a reinforcement material can be added to the matrix material powder to produce a reinforced matrix blank with additional strength which may be necessary to maintain the shape of the blank during impregnation by the molten carbonate or during cell operation. The reinforcement material should have substantially the same chemical inertness as the matrix material and preferred reinforcement materials are refractory metallic alloys which are corrosive resistant to the molten carbonate under fuel cell operating conditions. Particularly preferred are the refractory alloys comprised of a major amount of Fe alloyed with Cr, Al, and Co and sold under the trademark "Kanthal". Examples of specific "Kanthal" compositions suitable as reinforcement materials are as follows:

|  | Weight Percent | | | |
| --- | --- | --- | --- | --- |
|  | Al | Cr | Co | Fe |
| Type A-1 | 5.5 | 22 | .5 | 72 |
| Type A | 5 | 22 | .5 | 72.5 |
| Type D | 4.5 | 22 | .5 | 73 |

The reinforcement material can be in a number of forms such as a fine screen, fibers or woven mesh. In the present process, the reinforcement material is positioned, preferably, so that it is part of the internal structure of the matrix. Specifically, it is positioned within the matrix material powder, and the resulting structure is formed into a reinforced matrix blank, again using conventional ceramic processing techniques such as die-pressing, injection molding, extruding and tape casting at room temperature. Since the reinforcement material comprises inactive volume, it is used preferably in a volume ranging from about <1% to about 6% by volume of the reinforced matrix blank.

The thickness of the matrix blank, as well as the reinforced matrix blank, can vary and depends largely on final application. Ordinarily, it ranges from about 25 mils to about 250 mils, and matrix blanks of the lowest thickness are desirable to minimize resistance loss. There is no significant difference in thickness between the matrix blank and the resulting electrolyte tile. Also, the particular size of the blank can vary depending on final application.

The particulate electrolyte carbonate used depends largely on the fuel cell being constructed. Generally, it is selected from the group consisting of lithium carbonate, sodium carbonate, potassium carbonate, and mixtures thereof.

The molten, i.e. liquid, carbonate electrolyte can be infiltrated, i.e. impregnated, throughout the matrix blank filling the pore volume therein by a number of techniques, all of which should be carried out in an atmosphere which contains sufficient carbon dioxide, i.e. at least about $10^{-6}$ atmosphere of carbon dioxide, to maintain the molten carbonate electrolyte substantially stable. Preferably the atmosphere is carbon dioxide or air.

One method of electrolyte impregnation comprises heating the matrix blank and electrolyte to temperature at least about 10° K. higher than the liquidus temperature of the electrolyte and impregnating the molten electrolyte throughout the blank.

A preferred method comprises placing the matrix blank on a substrate which is chemically non-interactive with the molten electrolyte. To prevent deformation of the matrix blank, the surface of the substrate in contact with the matrix blank should be sufficiently non-uniform to provide passages for residual gases to escape before the non-uniform advancing molten electrolyte, i.e. electrolyte advancing from top to bottom of the matrix blank. An example of a suitable non-interacting substrate is an $\alpha$-$Al_2O_3$ plaque covered with a thin gold foil. A non-uniform surface for escaping gases can be imparted to the gold foil by initially wrinkling it and then straightening it out to leave "alligator skin"-type ridges in a random pattern across the entire surface. On the opposite exposed surface of the matrix blank, solid electrolyte is deposited in an amount sufficient to fill the pore volume of the matrix blank and it can be, for example, in the form of a uniformly distributed loose, premelted and ground powder, or as a pressed plate or disc which rests within the boundaries of the matrix surface.

The resulting assembly is heated to a temperature about 10° K. higher than the liquidus temperature of the electrolyte and the molten electrolyte is impregnated throughout the matrix blank. However, in carrying out this heating the passage through the electrolyte liquidus temperature should be a controlled process to prevent erosion of the matrix material from the surface of the blank. The problem is that the kinetics of electrolyte uptake and distribution by the matrix blank are somewhat slower than the kinetics of electrolyte melting. Therefore, the rate of molten electrolyte production must be less than or equal to the rate at which the molten electrolyte can impregnate the matrix blank. This rate of melting can be accomplished by limiting the rate of furnace heating through the electrolyte liquidus, i.e. the interval from about 10° K. below to about 10° K. above the electrolyte liquidus temperature, to $\leq$40° K. hour$^{-1}$, and generally from about 30° K. hour$^{-1}$ to 40° K. hour$^{-1}$. Outside of this interval, rates of heating as much as 200° K. hour$^{-1}$ have been successfully used and are not critical.

Electrolyte impregnation of the matrix blank is carried out at a temperature at least 10° K. higher than the liquidus temperature of the electrolyte, and which does not significantly vaporize the electrolyte. Preferably, it is carried out from about 50° K. to about 100° K. higher than the electrolyte liquidus temperature. Specifically, at the electrolyte liquidus temperature, the electrolyte is a relatively viscous liquid substance, but as the temperature is increased from the liquidus temperature, the electrolyte becomes less viscous and more readily flowable and such increased flowability enables a faster rate of electrolyte impregnation and equiliberation throughout the capillary-sized passages and interstices of the matrix blank.

Electrolyte impregnation of the matrix blank should be carried out so that the resulting electrolyte structure is pore-free when the electrolyte is in molten form.

The completion of electrolyte impregnation depends largely on the particular electrolyte and impregnation temperature.

The resulting electrolyte structure preferably is furnace cooled to room temperature. As the electrolyte component of the structure solidifies, it contracts leaving a pore volume generally ranging from about 5% to about 15% by volume of the electrolyte structure at room temperature.

If desired, the preferred method can be carried out utilizing two impregnation steps. Specifically, for the first impregnation step, the solid electrolyte can be deposited on the exposed surface of the matrix blank in an amount sufficient to fill from about 50% to about 90% by volume of the pore volume of the matrix blank, the resulting assembly heated, and the molten electrolyte impregnated into the matrix blank. Then, for the second impregnation step, an additional amount of solid electrolyte can be deposited on the impregnated surface of the resulting impregnated matrix in an amount sufficient to fill the remainder of the pore volume therein, and the resulting assembly heated to impregnate the electrolyte throughout the matrix blank filling the pore volume therein.

The invention is further illustrated by the following examples where, unless otherwise stated, the procedure was as follows:

Single compound electrolyte free $LiAlO_2$ powder was used as the supporting matrix material powder. This powder was prepared according to the process disclosed in the referenced co-pending application Ser. No. 8,734 entitled "Molten Salt Synthesis of Lithium Meta-Aluminate Powder". The as-prepared $LiAlO_2$ was subjected to a 973° K. ignition for about 3 hours in an air atmosphere in a platinum crucible in order to "harden" it against extensive hydration/dissolution during binder addition. Quantitative X-ray analysis of the resulting powder showed it to be composed of 72 volume % $\beta$-$LiAlO_2$, 11 volume % of $\alpha$-$LiAlO_2$ and 17 volume % of $\gamma$-$LiAlO_2$. The powder was white in color and submicron in size. B.E.T. measurement of the powder showed it to have a surface area of 6.43 meters$^2$ gram$^{-1}$.

A conventional ceramic processing organic binder, polyvinyl alcohol (Dupont 51-05), which contains no species which leave a detrimental residue, e.g., sulfur, etc., upon ignition was used. The $LiAlO_2$ powder was admixed with the polyvinyl alcohol to produce a composition composed of 99.5% LiAlO$_2$ and 0.5 wt. % polyvinyl alcohol. Specifically, to produce this composition, a 10 wt. % aqueous solution of the polyvinyl alcohol was prepared and the appropriate mass of this solution was added to the LiAlO$_2$ powder. Sufficient additional distilled H$_2$O then was added to give a reasonable viscosity slurry, which was then thoroughly blended by hand. The water was evaporated by gentle heating so as to avoid thermal degradation of the binder. The drying mixture was occasionally stirred to preclude gross binder segregation during drying. The dried material was passed gently through a 60 mesh nylon screen.

EXAMPLE 1

A 3"×6½" interior dimensioned steel die was shimmed to give a cavity 0.100" deep. This volume was filled uniformly with the powder composition 99.5 wt.% LiAlO$_2$-0.5 wt.% polyvinyl alcohol. The die was then carefully re-shimmed to give a cavity 0.200" deep, while maintaining the original powder bed undisturbed. Two ~3"×3" squares of Kanthal® A-1 wire mesh (20×20 wires inch$^{-1}$, 0.005" diameter wire), weighing ~0.82 g. each, were carefully placed side by side on the powder bed. The mesh was then covered with an additional amount of the LiAlO$_2$ polyvinyl alcohol powder, which was distributed, as before, to fill the die cavity. This assembly was then pressed at room temperature at 2000 psi for 30 seconds. This pressed body, i.e. the "matrix blank", was removed from the die and cut in half into two approximately equal pieces 3"×3¼"×0.100", each containing a square of reinforcing mesh embedded at the mid-plane of the blank.

Each blank was placed on a chemically non-interacting, gas permeable substrate comprised of a card of low density (~60%) α-Al$_2$O$_3$ plaque covered with a piece of 0.002" thick wrinkled gold foil. Each blank was placed on the gold foil, and the resulting assemblies were then heated to 650° C. for 3 hours in an air atmosphere to remove all organic and volatile materials. After the heating, one of the blanks weighed 17.29 grams and the other weighed 17.00 grams. Each matrix blank had a pore volume of about 60% by volume of the blank. It was known from other blanks that were prepared in the same manner with the same material that the pores in the blank were interconnecting and distributed uniformly throughout the blank and were substantially submicron in size. The exposed surface of one of the blanks, which weighed 17.29 g., was then covered with 12.78 g. of a melted and ground carbonate powder mixture comprised of 62 mole % Li$_2$CO$_3$-38 mole % K$_2$CO$_3$ which had a liquidus temperature of about 491° C. The resulting assembly, for the first impregnation step, was then rapidly heated (50°-250° C. hours$^{-1}$) to ~460° C., then at ~20° C. hour$^{-1}$ to 520° C., during which time impregnation occurred. Then rapidly to ~600° C. where it was held for an hour to allow the electrolyte distribution to distribute itself throughout the blank. The resulting electrolyte structure was then furnace cooled to room temperature at ~50° C. hour$^{-1}$. The electrolyte structure contained electrolyte in an amount of 42.50% by weight of the total weight of the structure.

An 8.25 g. of electrolyte of the same composition, was placed on the exposed surface of the thus-prepared electrolyte structure which still was supported on the substrate. The resulting assembly, for the second impregnation step, was then heated to ~600° C. and furnace-cooled in the same manner as disclosed for the first impregnation step giving a final electrolyte structure with an electrolyte content of 54.96% by weight of the total structure. At operating temperature of a molten fuel carbonate cell, this final electrolyte structure is pore free.

EXAMPLE 2

The final electrolyte structure prepared in Example 1 was incorporated into an operating molten fuel carbonate cell where twenty thermal cycles were successfully completed without the development of serious gas leakage problems. Electrochemical performance was comparable with that of similar cells using conventionally fabricated electrolyte structures.

EXAMPLE 3

In this example the second blank which was prepared in Example 1, which weighed 17.00 grams, was used.

The procedure used in this example was the same as that set forth in Example 1 except that 10.68 grams of the carbonate powder mixture were used for the first impregnation step producing an electrolyte structure which contained electrolyte in an amount of 38.98% by weight of the total weight of the structure, and 6.14 grams of the carbonate mixture were used for the second impregnation step giving a final electrolyte structure with an electrolyte content of 50.15% by weight of the total weight of the structure.

At operating temperature of a molten fuel carbonate cell, this final electrolyte structure is pore free.

We claim:

1. A process for producing an electrolyte structure for a molten carbonate fuel cell, said electrolyte structure being comprised of electrolyte and supporting matrix, which comprises providing supporting matrix material powder wherein the particles range in size up to about 1 micron and which is at least substantially chemically inert under the operating conditions of said molten carbonate fuel cell, forming said supporting matrix material powder into a blank wherein the pore volume is interconnecting and comprised of capillary-sized interstices between compacted particles and is at least substantially uniformly distributed and ranges from about 50% by volume to about 70% by volume of the blank, positioning said matrix blank on a substrate so that electrolyte can be deposited on a top face thereof and gases can escape from the bottom face thereof, heating said matrix blank and electrolyte to a temperature at least about 10° K. higher than the liquidus temperature of the electrolyte but at which it does not significantly vaporize the electrolyte, contacting the resulting molten electrolyte with the top face of said matrix blank whereupon said molten electrolyte impregnates through said top face advancing throughout said matrix blank until the resulting electrolyte structure is pore free when the electrolyte is in molten form, said impregnation being carried out in an atmosphere which contains sufficient carbon dioxide gas to at least substantially maintain the stability of the molten electrolyte, said substrate being chemically non-interactive with said molten electrolyte.

2. A process for producing an electrolyte structure for a molten carbonate fuel cell, said electrolyte structure being comprised of electrolyte and supporting matrix, which comprises providing supporting matrix material powder wherein the particles range in size up to about 1 micron and which is at least substantially chemically inert under the operating conditions of said molten carbonate fuel cell, forming said supporting matrix material powder into a blank wherein the pore volume is interconnecting and comprised of capillary-sized interstices between compacted particles and is at least substantially uniformly distributed and ranges from about 50% by volume to about 70% by volume of the blank, placing said matrix blank on a substrate, on the opposite exposed surface of the matrix blank depositing solid electrolyte in an amount sufficient when molten to fill the pore volume of said matrix blank, heating the resulting assembly to a temperature at least about 10° K. above the liquidus temperature of said electrolyte but at which it does not significantly vaporize whereupon the resulting molten electrolyte impregnates the contacting matrix blank surface advancing throughout the matrix blank filling the pore volume therein so that the resulting electrolyte structure is pore free when the electrolyte is in molten form, said heating being carried out in an atmosphere containing sufficient carbon dioxide to maintain the stability of said molten electrolyte, said substrate being chemically non-interactive with said molten electrolyte, the surface of said substrate in contact with said matrix blank being sufficiently non-uniform to allow residual gases to escape the advancing molten electrolyte.

3. A process according to claim 2 wherein said electrolyte is selected from the group consisting of lithium carbonate, sodium carbonate, potassium carbonate and mixtures thereof.

4. A process according to claim 2 wherein said supporting matrix material powder is die-pressed into a blank.

5. A process according to claim 2 wherein said atmosphere is air.

6. A process according to claim 2 wherein said supporting matrix material powder is $LiAlO_2$.

7. A process according to claim 2 wherein the rate of heating at the temperature interval ranging from about 10° K. below the liquidus temperature of the electrolyte up to about 10° K. above the liquidus temperature of the electrolyte is $\leq 40°$ K. hour$^{-1}$.

8. A process for producing an electrolyte structure for a molten carbonate fuel cell, said electrolyte structure being comprised of electrolyte and supporting matrix, which comprises providing supporting matrix material powder wherein the particles range in size up to about 1 micron and which is at least substantially chemically inert under the operating conditions of said molten carbonate fuel cell, forming said supporting matrix material powder into a blank wherein the pore volume is interconnecting and comprised of capillary-sized interstices between compacted particles and is at least substantially uniformly distributed and ranges from about 50% by volume to about 70% by volume of the blank, placing said matrix blank on a substrate, on the opposite exposed surface of the matrix blank depositing solid electrolyte in an amount sufficient to fill from about 50% by volume to about 90% by volume of the pore volume of the matrix blank, heating the resulting assembly to a temperature at which said electrolyte is molten but at which it does not significantly vaporize whereupon the resulting molten electrolyte impregnates through the contacting matrix blank surface and into the matrix blank, depositing additional solid electrolyte on the impregnated surface of the resulting impregnated matrix in an amount sufficient when molten to fill the remainder of the pore volume of said impregnated matrix, heating the resulting assembly to said temperature whereupon the resulting additional molten electrolyte impregnates said impregnated surface and into the matrix blank filling the pore volume therein so that the resulting electrolyte structure is pore free when the electrolyte is in molten form, said heating being carried out in an atmosphere containing sufficient carbon dioxide to maintain the stability of said molten electrolyte, said substrate being chemically non-interactive with said molten electrolyte the surface of said substrate in contact with said matrix blank being sufficiently non-uniform to allow residual gases to escape the advancing molten electrolyte.

9. A process according to claim 8 wherein said electrolyte is selected from the group consisting of lithium carbonate, sodium carbonate, potassium carbonate and mixtures thereof.

10. A process according to claim 8 wherein said supporting matrix material powder is $LiAlO_2$.

* * * * *